United States Patent Office

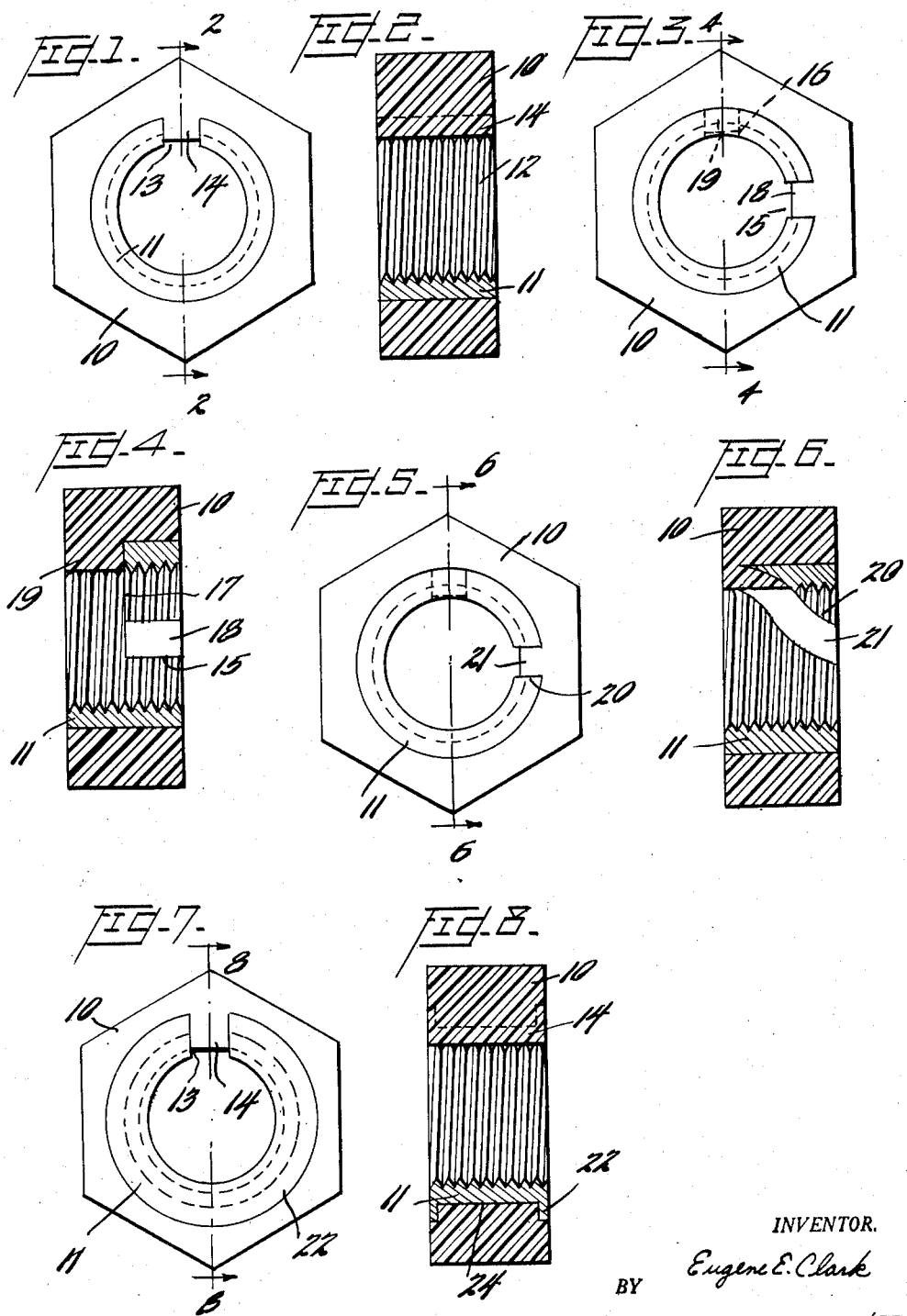

2,832,391
Patented Apr. 29, 1958

2,832,391

NYLON LOCK NUT WITH SPLIT METAL CORE TO PROVIDE FRICTIONAL AND RESILIENT LOCKING ACTION

Eugene E. Clark, Foster Center, R. I., assignor to American Screw Company, Willimantic, Conn., a corporation of Rhode Island Application March 16, 1954, Serial No. 416,573

5 Claims. (Cl. 151—7)

The present invention relates to internally threaded fastener elements, and more particularly to nuts having self-locking characteristics. Fastening elements of this general type are well known, and have gone into rather widespread use, such nuts comprising a more or less conventional metal body, threaded internally, provided with an insert of fiber, hard rubber, or the like. The insert is usually in the form of a plug or ring retained in a recess or groove formed in the inner or threaded surface of the nut.

Quite recently it has been proposed to use nylon and similar moldable plastics in fabricating nuts, such materials having the advantages of lightness, resiliency and insulating value. While possessed of reasonable strength and toughness characteristics, however, such materials lack sufficient strength in shear to resist substantial loads, wherefore nuts fabricated of these materials are easily stripped of their threads upon being tightened to any great extent. The use of nylon and similar materials for the fabrication of threaded elements, therefore, has not extended substantially beyond an experimental stage, notwithstanding the aforesaid desirable characteristics possessed by such materials and notwithstanding the fact that the natural resilience of such materials makes them especially desirable for the fabrication of nuts having a self-locking characteristic.

A general object of the present invention is the provision of a composite nut having an outer body of molded nylon or similar plastic material and an inner tubular core of metal possessing the necessary strength characteristics, the core being internally threaded and longitudinally split, whereby the plastic material of the outer body penetrates the core sufficiently to establish frictional contact with the threads of the male fastener element with which the nut is associated. Such a nut possesses a self-locking characteristic by virtue of the engagement of the longitudinal nylon ridge with all of the threads of the male element which are surrounded by the nut, which locking characteristic is enhanced by the natural resilience of the nylon body, expansion and contraction of which are permitted by virtue of the fact that the tubular core is longitudinally split.

If the outer surface of the tubular core is a simple cylinder, and the longitudinal split is straight, there is a tendency for the metal core to be stripped from the nylon body upon tightening the nut. This tendency may be counteracted in any of several ways, i. e., by forming the longitudinal split in a helical curve, or by dividing it into two portions which are angularly offset and are connected by a circumferential split, or by providing the core with annular flanges at either end which flanges embrace, at least partially, the respective ends of the nylon body. The provision of a nut having each of these special forms constitutes a separate object of the invention.

Other and further objects, features and advantages will be apparent from the description which follows, read in connection with the accompanying drawings in which—

Figures 1, 3, 5 and 7 are elevational views illustrating separate embodiments of the invention; and Figures 2, 4, 6 and 8 are sectional views taken on lines 2—2 of Figure 1, 4—4 of Figure 3, 6—6 of Figure 5, and 8—8 of Figure 7, respectively.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 1 and 2 the nut there illustrated comprises a body portion 10 of molded nylon or similar light, tough, resilient, moldable plastic material and a hollow cylindrical metal core 11 which is internally threaded as at 12. The thread 12 has such dimensions that the nut, except for the friction of the longitudinal ridge of plastic mentioned below, is a free running nut. The core 11 is provided with an appreciably wide longitudinal split 13 into which a longitudinal ridge 14 of the molded plastic material extends, being formed therein during the molding process. The external contour of the body 10 may be of hexagon shape, as illustrated, or of any other suitable shape. As will be readily noted in Figure 1, the ridge 14 extends inwardly through the split 13 to such a distance that its exposed surface lies inwardly beyond the root of the threads 12. Thus, upon engagement of the nut with a male threaded member, the ridge 14 will be deformed by engagement with the male threads and will exert a frictional grip thereon. As the nut is screwed onto the male thread, frictional contact only is made with the exposed plastic material. However, upon tightening, pressure is exerted on the flank of the internal thread on the side nearest the bearing surface of the nut. This pressure on the inclined flank of the thread results in expansion of the sleeve, which is resisted, resiliently, by the nylon. Thus the effectiveness of the self-locking characteristic is enhanced by the natural resilience of the nylon body 10, which is brought into play through the fact that the core 11 is split and thus may expand radially upon engagement with a screw or bolt.

In Figures 3 and 4 the longitudinal split is divided into two portions 15 and 16 at the respective ends of the core 11, which portions are angularly offset so as to neutralize any tendency of the core to separate, longitudinally, from the body 10. The two split portions 15 and 16 are connected, by a circumferential slit 17 to permit radial expansion of the core 11 with the advantages heretofore explained. The nylon ridge which penetrates the core is, of course, similarly divided into angularly offset portions 18 and 19.

In the embodiment illustrated in Figures 5 and 6, the split 20 and ridge 21 are of helical form, thus serving to resist longitudinal separation of the core 11 and body 10.

In Figures 7 and 8 there is illustrated an embodiment in which the core 11 is provided with a straight split 13 as in the embodiment of Figure 1, but is additionally provided with outwardly projecting annular flanges 22 and 23 at its respective ends, which tightly embrace the central portion 24 of the nylon body 10, thus preventing longitudinal separation of the core and body.

Internally threaded fastener elements constructed according to the present invention will be light in weight, will have valuable thermal and electrical insulation characteristics, and a pronounced self-locking characteristic resulting from the frictional engagement of the inwardly extending plastic ridge 14 or 21, or ridge portions 15 and 16 with the threads of the mating element. This latter characteristic will be enhanced due to the natural resilience of the nylon or other plastic body 10, which is permitted to come into effect by the fact that the metal core is split from end to end, in each case. At the same time, the nut will have ample strength in shear, due to the fact that its threads are formed of metal having the necessary strength characteristics.

Having thus described the invention, what is claimed as new and desired to be secured by Letters Patent is:

1. Internally threaded fastener element comprising an outer body of tough, resilient, moldable synthetic plastic material, said body having an external tool-engaging surface, and an internally threaded tubular core of metal, that thread flank which is adapted to be in compressive engagement with a mating thread, when the element is tightened, being inclined to the longitudinal axis of the fastener element, said internal thread having dimensions falling within the normal tolerances for that class of threads pertaining to free running nuts, said core being split continuously from end to end and said body having an internal ridge extending through said split to a point beyond the root of said thread.

2. A fastener element according to claim 1, said split and said ridge being curved between the respective ends of said element.

3. A fastener element according to claim 1, said split and said ridge being each divided into a plurality of longitudinally disaligned portions.

4. A fastening element according to claim 3, the adjacent ends of said longitudinal split portions being connected by slit means extending through the wall of said core.

5. A fastening element according to claim 1, said core having flanged ends at least partially embracing the ends of said body.

References Cited in the file of this patent

UNITED STATES PATENTS

| 2,333,388 | Poupitch | Nov. 2, 1943 |
| 2,399,107 | Eckenheck | Apr. 23, 1946 |
| 2,425,104 | Luce | Aug. 5, 1947 |
| 2,570,658 | Farrell et al. | Oct. 9, 1951 |

FOREIGN PATENTS

| 490,680 | Great Britain | Aug. 18, 1938 |
| 665,544 | Great Britain | Jan. 23, 1952 |